United States Patent
Onishi et al.

(10) Patent No.: US 8,393,428 B2
(45) Date of Patent: Mar. 12, 2013

(54) VEHICLE WITH ENGINE OUTPUT CONTROL

(75) Inventors: Yoji Onishi, Lincoln, NE (US); Yoshinori Tsumiyama, Lincoln, NE (US); Hidetoshi Kaku, Lincoln, NE (US); Tyler Furman, Raymond, NE (US); Kazuma Waida, Kobe (JP); Hiroyuki Iwai, Kobe (JP); Hirokazu Morita, Kakogawa (JP); Kazuhiro Maeda, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 458 days.

(21) Appl. No.: 12/711,788

(22) Filed: Feb. 24, 2010

(65) Prior Publication Data

US 2011/0204669 A1  Aug. 25, 2011

(51) Int. Cl.
*B60K 8/00* (2006.01)

(52) U.S. Cl. ..................................... 180/69.3; 180/54.1

(58) Field of Classification Search ................. 180/69.3, 180/54.1
See application file for complete search history.

(56) References Cited

U.S. PATENT DOCUMENTS

| 6,905,159 | B1  | 6/2005 | Saito et al. |
| 6,994,388 | B2  | 2/2006 | Saito et al. |
| 7,249,798 | B2  | 7/2007 | Saito et al. |
| 7,983,817 | B2* | 7/2011 | Breed .............................. 701/45 |

* cited by examiner

*Primary Examiner* — Jeffrey J Restifo
*Assistant Examiner* — Erez Gurari
(74) *Attorney, Agent, or Firm* — Wenderoth, Lind & Ponack, LLP (57) ABSTRACT

A vehicle includes a front seat and a rear seat that is changeable between an installed state in which the passenger can be seated and a retracted state in which the passenger is not seated and the rear seat is retracted. The vehicle includes an output control unit controlling the output of an engine, and a detection device for detecting the installed state of the rear seat. When the detection device detects the installed state of the rear seat, the output control unit regulates the output of the engine as compared with the output when the detection device does not detect the installed state of the rear seat.

8 Claims, 9 Drawing Sheets

VEHICLE WITH ENGINE OUTPUT CONTROL

BACKGROUND OF THE INVENTION

1. Field of the Invention

The present invention relates to a vehicle. More specifically, the present invention relates to a pick-up style utility vehicle which can expand a cargo bed forward or enlarge a passenger space so as to make the most of the area or capacity of the space of the cargo bed and the passenger space according to the needs of users, or to an all terrain vehicle.

2. Description of the Prior Art

At present, utility vehicles of various styles are used. In addition to pick-up style utility vehicles with a relatively large cargo bed behind a seat, there are straddle-type all terrain vehicles having a handle bar, or the like.

Typically, the pick-up style utility vehicles are more practical than the handle bar type utility vehicles belonging to the straddle-type all terrain vehicles. The pick-up style utility vehicles are used for hunting in fields and mountains, conveyance of lumber, movement and maintenance on golf courses, and more.

The present applicants have formerly developed inventions relating to the pick-up style utility vehicle with a cargo bed whose area or capacity can be expanded. The inventions are disclosed in, for example, U.S. Pat. Nos. 6,905,159, 6,994, 388, and 7,249,798.

The configuration of the pick-up style utility vehicle disclosed in the respective documents includes a front seat including a driver's seat, a rear seat, and a cargo bed in this order from the front of the vehicle. The rear seat can be changed between a used state and a retracted state so as to be switched between a 2 passengers transformation and a 4 passengers transformation, and in the 2 passengers transformation, a front portion of the cargo bed is expandable into a riding space occupied by the rear seat in the used state.

In the pick-up style utility vehicle of the prior art, when the passenger is seated on the rear seat, the load distribution of the pick-up style utility vehicle is changed, and the vehicle body behavior such as handling is changed as compared with when the passenger is seated only on the front seat. Depending on when the passenger is seated on the rear seat or not, drivability is different.

SUMMARY OF THE INVENTION

The present invention has been made in view of the above problems and an object of the present invention is to improve drivability by performing the output control of a vehicle when the passenger is seated on a rear seat.

In order to achieve the above objects, the present invention provides a vehicle including: a front seat; and a rear seat. The rear seat is changeable between an installed state in which the passenger can be seated and a retracted state in which the passenger is not seated and the rear seat is retracted. The vehicle includes: an output control unit controlling the output of an engine; and detection means for detecting the installed state of the rear seat. When the detection means detects the installed state of the rear seat, the output control unit regulates the output of the engine as compared with the output when the detection means does not detect the installed state of the rear seat.

With the above configuration, when the rear seat is moved into an installed state, the output control unit regulates the output of the engine so that the influence of the change of load distribution caused when the passenger is seated on the rear seat can be reduced. The drivability of the vehicle can be improved. In addition, when the rear seat is moved into the installed state, the output of the engine is regulated so that when there is a possibility that the passenger may be seated on the rear seat, the output of the engine is regulated by simply moving the rear seat into the installed state. The output of the engine can be regulated more reliably.

According to the present invention, preferably, a seating portion of the rear seat in the installed state is moved into a substantially horizontal state, the detection means is a switch capable of detecting a load and is provided on a bottom surface of the seating portion when the seating portion of the rear seat is in the substantially horizontal state. When the seating portion of the rear seat is moved to the substantially horizontal state, the switch is pressed by the load of the rear seat to detect the installed state of the rear seat.

With the above configuration, in the installed state of the rear seat, the detection means detects the installed state of the rear seat due to the load of the rear seat. The installed state of the rear seat can be easily detected.

According to the present invention, preferably, a backrest of the rear seat in the installed state is brought to an erected state, the detection means is a switch detecting a load and is provided on the backrest of the rear seat, and the backrest of the rear seat is brought to the erected state so that the switch is contacted with a partitioning member partitioning a riding space and a cargo bed to detect the installed state of the rear seat.

With the above configuration, in the installed state of the rear seat, the detection means is contacted by the partitioning member to detect the installed state of the rear seat. The installed state of the rear seat can be easily detected.

According to the present invention, preferably, the output control unit changes or retards the ignition timing of an engine to regulate the output of the engine.

With the above configuration, the output of the engine can be easily regulated, and for instance, the maximum speed and acceleration of the vehicle can be regulated.

In the present invention, the output control unit may preferably reduce the fuel injection quantity of the engine to regulate the output of the engine.

With the above configuration, the output of the engine can be easily regulated, and for instance, the maximum speed and acceleration of the vehicle can be regulated.

In order to achieve the above objects, the present invention provides a vehicle including: a front seat; and a rear seat. The rear seat is changeable between the installed state in which the passenger can be seated and the retracted state in which the passenger is not seated and the rear seat is retracted. The vehicle includes: an output control unit controlling the output of an engine; and detection means for detecting the retracted state of the rear seat. When the detection means does not detect the retracted state of the rear seat, the output control unit regulates the output of the engine as compared with the output when the detection means detects the retracted state of the rear seat.

With the above configuration, when the rear seat is not in the retracted state, the output control unit regulates the output of the engine so that the influence of the change of load distribution caused when the passenger is seated on the rear seat can be reduced. The drivability of the vehicle can be improved. In addition, when the rear seat is not in the retracted state, the output of the engine is regulated so that when there is a possibility that the passenger may be seated on the rear seat, the output of the engine is regulated. The output of the engine can be regulated more reliably.

DETAILED DESCRIPTION OF THE PREFERRED EMBODIMENTS

Figure 1:
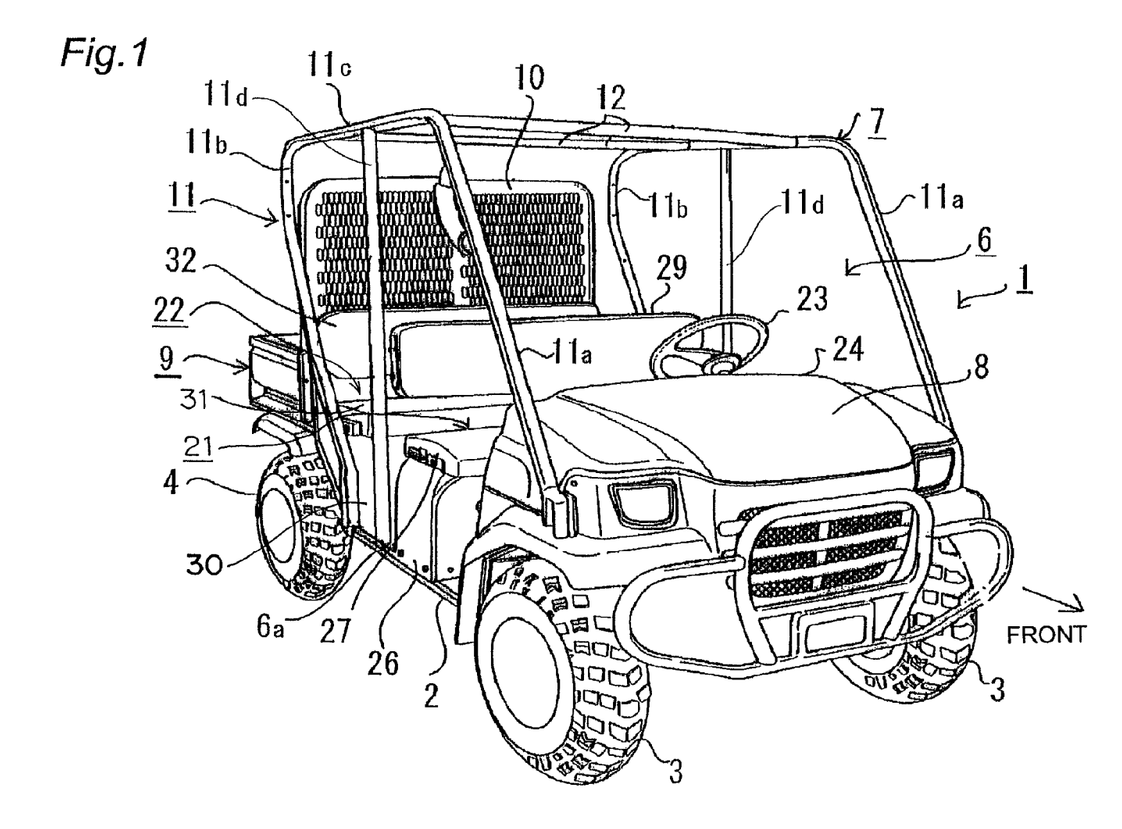
FIG. 1 is an overall perspective view of a pick-up style utility vehicle according to the present invention.
Figure 2:
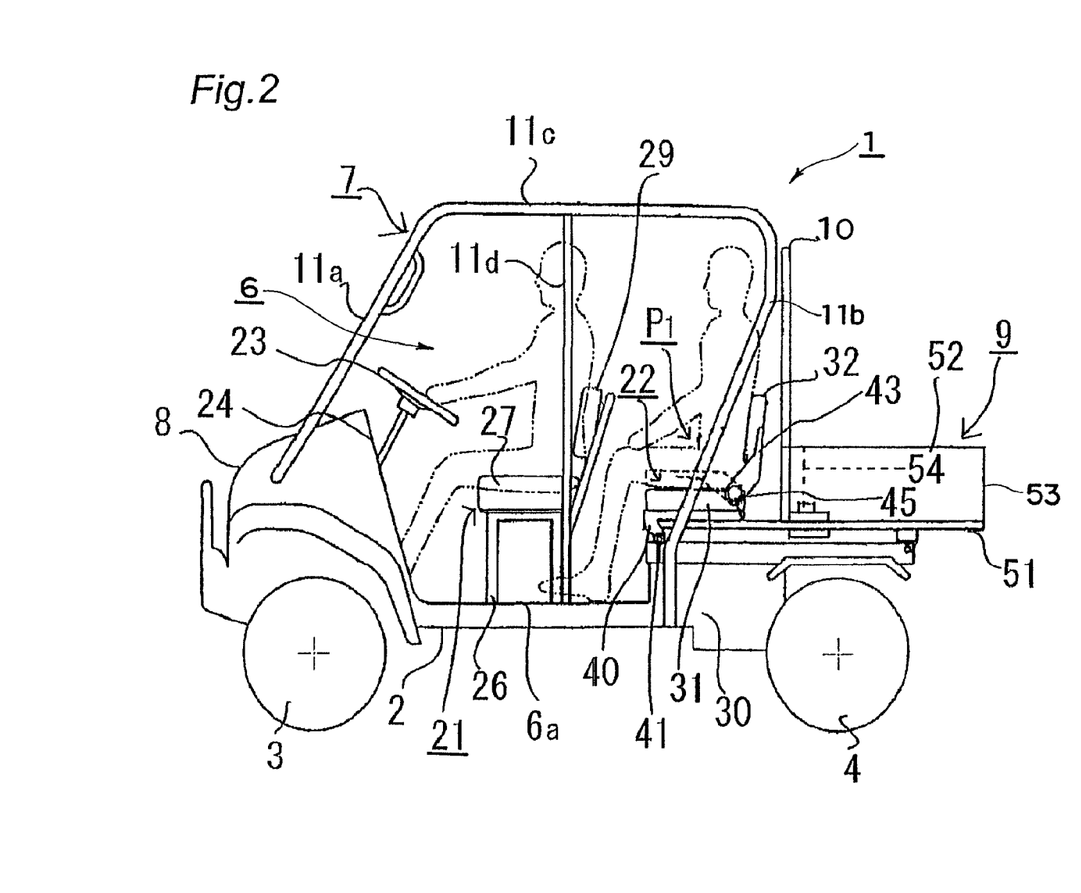
FIG. 2 is a left side view of the pick-up style utility vehicle in the 4 passengers transformation.
Figure 3:
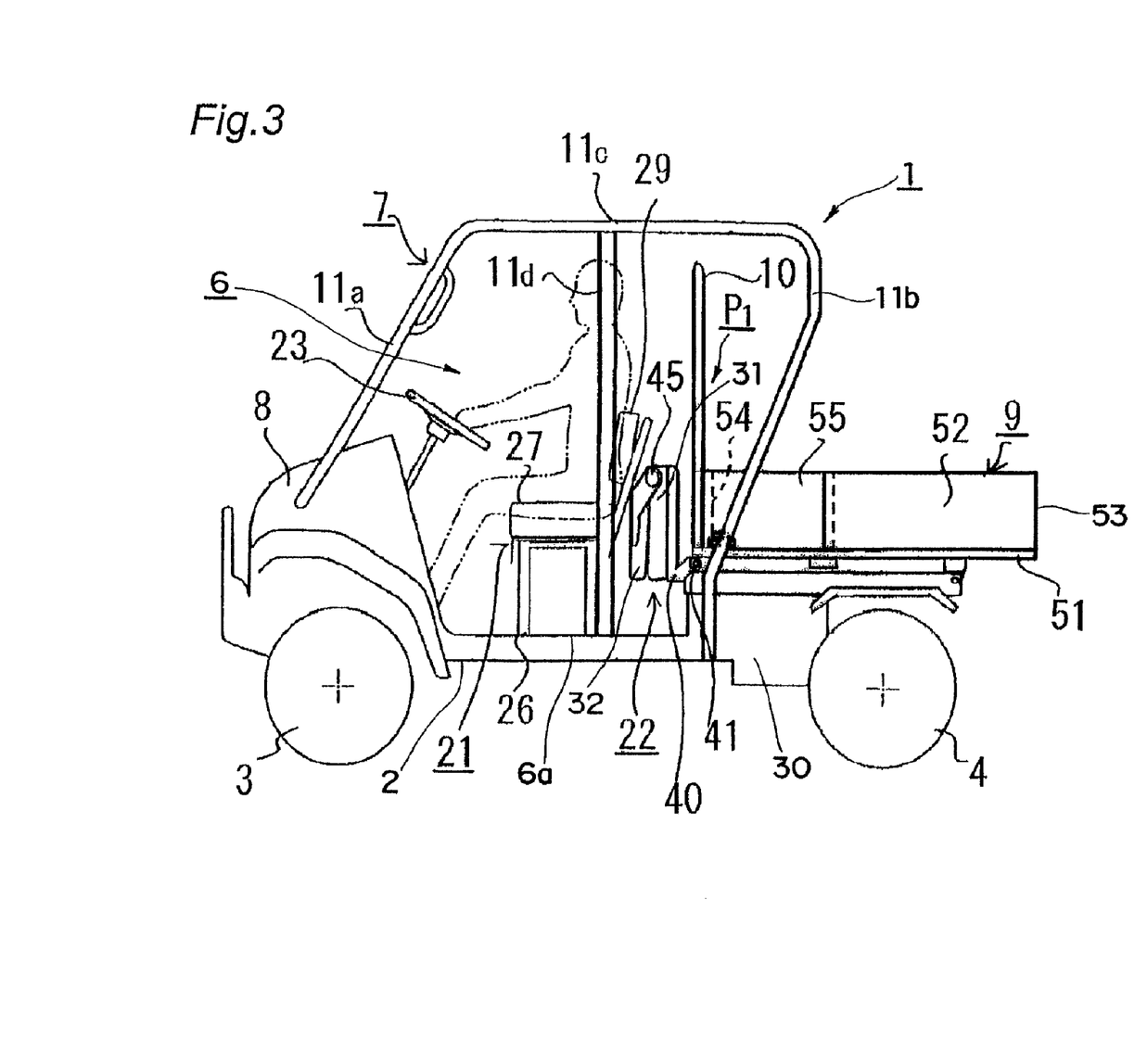
FIG. 3 is a left side view of the pick-up style utility vehicle in the 2 passengers transformation.

FIGS. 1 to 3 show a pick-up style utility vehicle 1 according to the present invention, which is changeable between a 4 passengers transformation contracting a cargo bed 9 as shown in FIG. 2 and a 2 passengers transformation folding a rear seat 22 and expanding the cargo bed 9 forward as shown in FIG. 3. The configuration of the pick-up style utility vehicle will be described below in detail with reference to the drawings.

FIG. 1 is a perspective view of the pick-up style utility vehicle 1. FIG. 2 is a left side view of the pick-up style utility vehicle 1 of FIG. 1. FIG. 3 is a left side view when the pick-up style utility vehicle 1 of FIG. 2 in the 4 passengers transformation is changed to the 2 passengers transformation. The pick-up style utility vehicle 1 includes a vehicle body 2 supported by a pair of left and right front wheels 3 and a pair of left and right rear wheels 4. A cabin frame 7 configuring a cabin 6 is provided in an intermediate portion on the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at a front end of the cargo bed 9 so as to be position changeable forward and rearward.

The cabin frame 7 surrounding the cabin 6 includes a pair of left and right side frame members 11 made of metal pipes formed in a substantially inverted U-shape as seen from the side, and cross frame members 12 made of a plurality of metal pipes coupling the side frame members 11. Each of the side frame members 11 includes a front side portion 11a extended rearward and upward from near the left or right side portion of the hood 8, a rear side portion 11b extended substantially upward from the left or right side portion of a rear end of the cabin 6, an upper side portion 11c integrally coupling an upper end of the front side portion 11a and an upper end of the rear side portion 11b and extended forward and rearward, and an intermediate vertical portion 11d coupling the intermediate portion of the upper side portion 11c in the front-rear direction and a floor surface 6a.

A bench-shaped front seat 21 is installed in a front half portion of the cabin 6. The bench-shaped rear seat 22 is installed in a rear half portion of the cabin 6. A dashboard (operating portion) 24 having a steering wheel 23 is provided at a front end of the cabin 6.

The bench-shaped front seat 21 includes a seat leg 26 erected on the floor surface 6a of the cabin 6, a seating portion 27 provided on the upper end face of the seat leg 26, and a backrest 29 fixed via a supporting stay to the intermediate vertical portion 11d. The bench-shaped front seat 21 is typically extended leftward and rightward to near left and right ends of the cabin 6. With this, two persons can be seated side by side. The driver can be seated on one (e.g., left) seating area and the passenger can be seated on the other seating area. The front seat 21 can also be a box type seat.

The bench-shaped rear seat 22 is installed on an upper side of a housing space 30 in which part of an engine and a power transmission system are arranged and includes a seating portion 31 and a backrest 32. As in the front seat 21, the seating portion 31 and the backrest 32 are extended leftward and rightward to near the left and right ends of the cabin 6. With this, two passengers can be seated side by side. The rear seat 22 can also be a box type seat that can be housed.

As shown in FIG. 2, the cargo bed 9 includes a stationary bottom plate 51, a pair of stationary side panels 52 provided substantially perpendicularly with respect to the stationary bottom plate 51 along left and right ends of the stationary bottom plate 51, an openable and closeable gate type rear panel 53 provided at a rear end of the stationary bottom plate 51, and a front panel 54 that can be adjusted forward and rearward. In addition to these members, as shown in FIG. 3, to expand the cargo bed 9 forward, the cargo bed 9 includes a pair of left and right expandable side panels 55.

The configuration of the rear seat 22 will be described below in greater detail.

Figure 4:
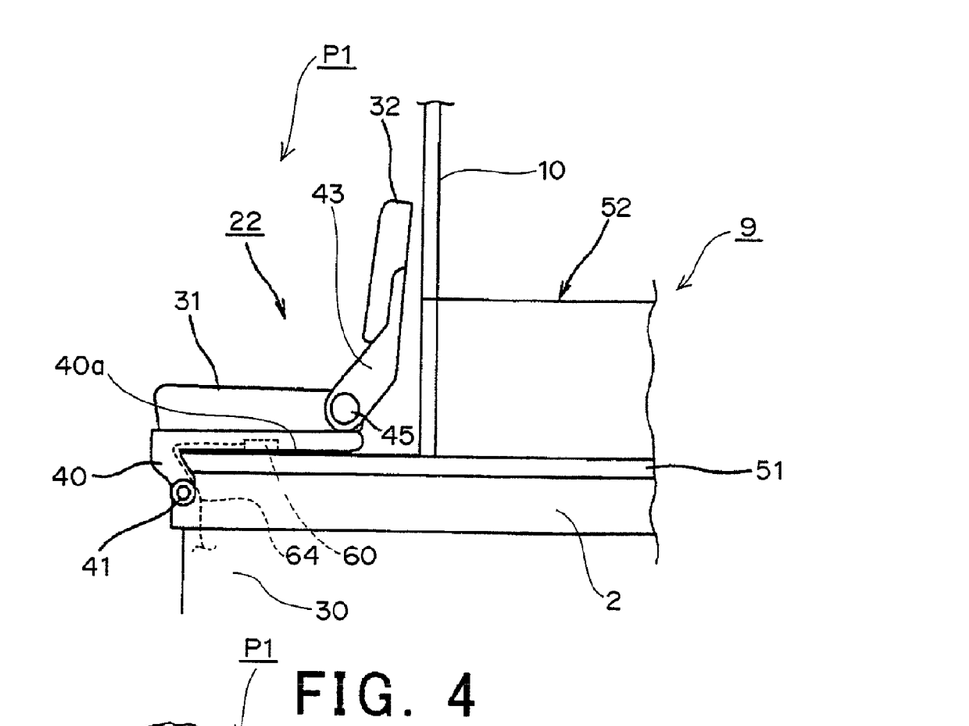
FIG. 4 is a left side view of a rear seat portion in the 4 passengers transformation.

FIG. 4 is a left side view of the rear seat 22 portion of FIG. 2 and shows an installed state in which the passenger can be seated on the rear seat 22. The seating portion 31 is fixed to the upper surface of a supporting base 40. A front end of the supporting base 40 is rotatably supported via hinges 41 at a front upper end of the vehicle body frame 2 located in the lower portion of the cargo bed 9. A pair of left and right stays 43 extended downward is fixed to the backrest 32. Lower ends of the stays 43 are rotatably coupled via hinges 45 to a rear end of the seating portion 31.

Figure 5:
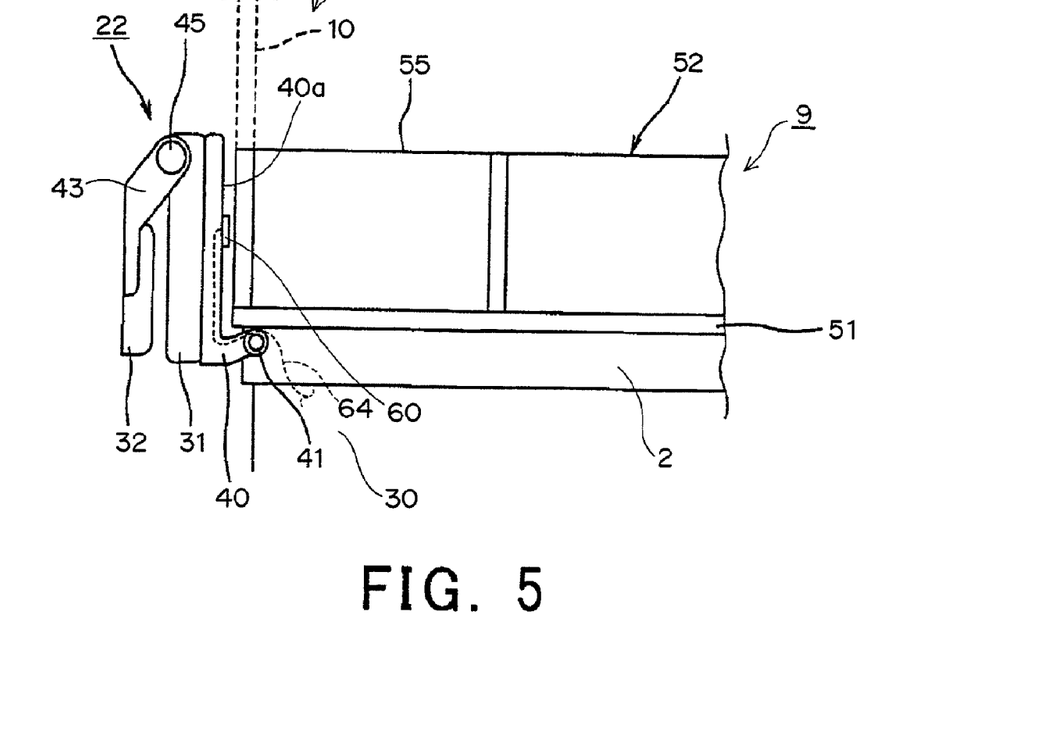
FIG. 5 is a left side view of the rear seat portion in the 2 passengers transformation.
Figure 6:
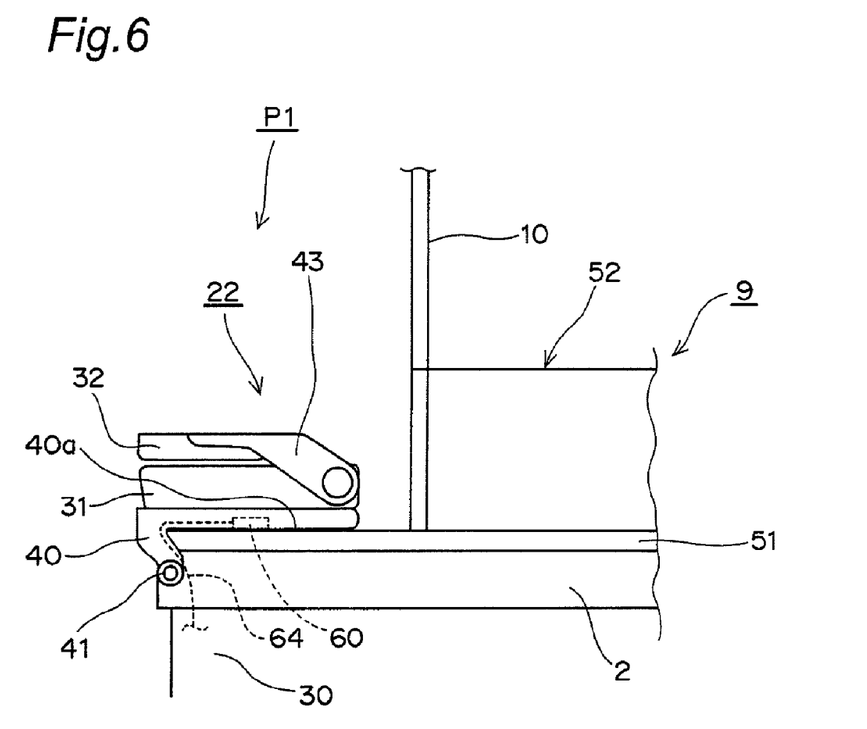
FIG. 6 is a left side view of the rear seat portion while the 4 passengers transformation of FIG. 4 is changed to the 2 passengers transformation of FIG. 5.

FIG. 5 is a left side view of the pick-up style utility vehicle 1 of FIG. 3. FIG. 6 is a left side view of the rear seat 22 portion while the 4 passengers transformation of FIG. 4 is changed to the 2 passengers transformation of FIG. 5. In the rear seat 22 shown in FIG. 4, the backrest 32 is rotated about the hinges 45 so as to be contacted with the upper surface of the seating portion 31 so that the rear seat 22 is in the state shown in FIG. 6. The seating portion 31 is then rotated about the hinges 41 so as to be brought to a substantially vertical state together with the backrest 32, whereby as shown in FIG. 5, the rear seat 22 is folded in a retracted state. Thus, the rear seat 22 is folded and retracted so that a rear riding space P1 can be used as the forward expanded space of the cargo bed 9.

The operation of changing the pick-up style utility vehicle 1 from the 4 passengers transformation shown in FIG. 2 to the 2 passengers transformation shown in FIG. 3 and expanding the cargo bed 9 will be described below.

In the 4 passengers transformation shown in FIG. 2, the supporting base 40 and the seating portion 31 of the rear seat 22 are located on an upper side of the stationary bottom plate 51 and the backrest 32 is erected upward. The front panel 54 of the cargo bed 9 is located behind the backrest 32. Accordingly, the screen shield 10 attached to the front panel 54 is located behind the backrest 32 of the rear seat 22 and in the position partitioning the cargo bed 9 and the rear riding space P1.

To change from the 4 passengers transformation shown in FIG. 2 to the 2 passengers transformation shown in FIG. 3, the backseat 32 of the rear seat 22 is rotated forward about the hinges 45 so as to be overlapped with the upper surface of the seating portion 31. Then, the seating portion 31 and the backrest 32 are rotated forward about the hinges 41 together with the supporting base 40 and are retracted in the substantially vertical state in a space immediately behind the front seat 21.

The pair of left and right expandable side panels 55 is opened forward and is expanded forward from front ends of the stationary side panels 52. The front panel 54 is attached to front ends of the expandable side panels 55. The screen shield 10 is attached to the front panel 54 and is moved forward to the front ends of the expandable side panels 55. By the above operation, the pick-up style utility vehicle 1 is changed from the 4 passengers transformation to the 2 passengers transformation to expand the cargo bed 9 forward.

When the pick-up style utility vehicle 1 is changed from the 2 passengers transformation shown in FIG. 3 to the 4 passengers transformation shown in FIG. 2 to contract the unexpanded cargo bed 9, the above operation is reversed.

As shown in FIG. 4, a switch 60 is provided on a bottom plate 40a of the supporting base 40 of the rear seat 22. When the rear seat 22 is brought to the installed state (substantially horizontal state), the switch 60 is pressed onto the stationary bottom plate 51 by the load of the rear seat 22. Here, the switch 60 may be brought to an ON state by bringing the rear seat 22 to a state shown in FIG. 6 while the 2 passengers transformation shown in FIG. 5 is changed to the 4 passengers transformation shown in FIG. 4, that is, by bringing the seating portion 31 of the rear seat 22 to the substantially horizontal state. In addition, the switch 60 may be brought to the ON state by simply being contacted with a different member.

The switch 60 includes a resilient member. As shown in FIG. 5, when the rear seat 22 is moved to the retracted state (an erected state as the substantially vertical state), the switch 60 is released from the pressing load of the rear seat 22 and returns to the unpressed state by the resilient force of the resilient member. With this, the pressed state of the switch 60 is released, that is, the switch 60 is brought to an OFF state. Here, the switch 60 may be brought to the OFF state by simply not being contacted with a different member.

Figure 7:
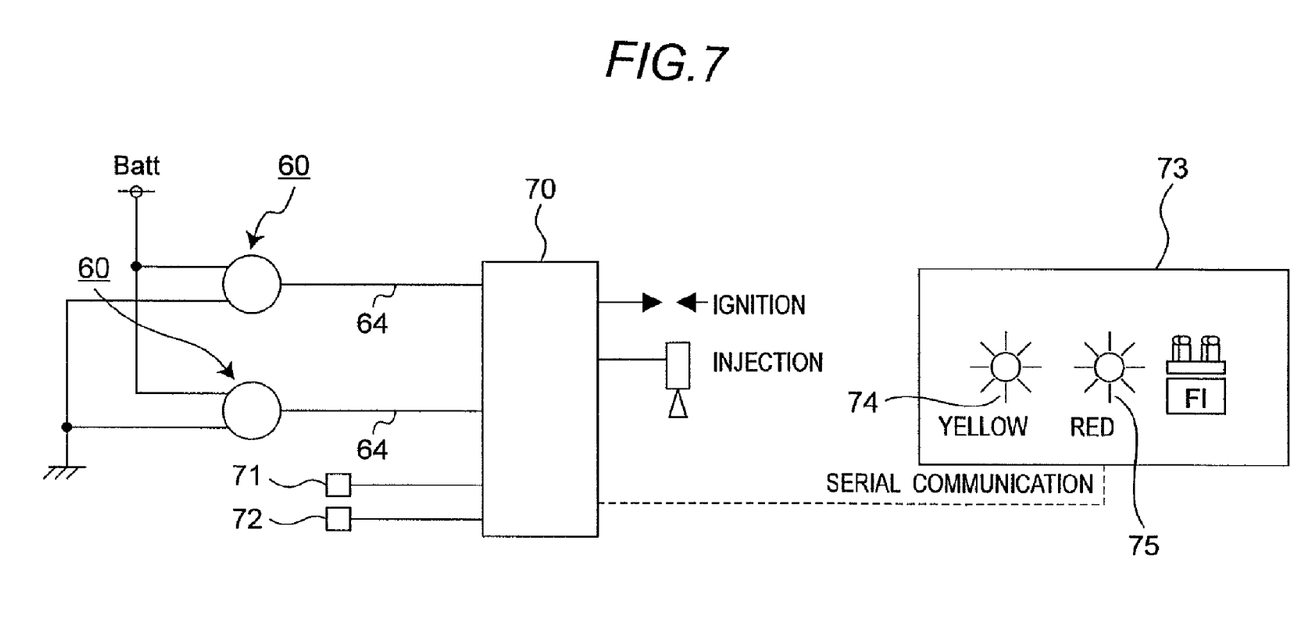
FIG. 7 is a diagram showing the connection configuration of an ECU 70.

The pick-up style utility vehicle 1 includes an electronic control unit (ECU) 70 controlling the engine. FIG. 7 is a diagram showing the connection configuration of the ECU 70. As shown in FIG. 7, the ECU 70 controls an ignition timing and fuel injection time based on information from a speed sensor 71 attached to the front wheel 3 and/or the rear wheel 4 and a crank angle sensor 72 detecting the top dead center position of a cylinder and a crank angle.

The ECU 70 is also connected to the switch 60 by a cable 64 and detects the signal from the switch 60 (a pressed state is referred to as an ON signal and a press released state is referred to as an OFF signal). When the switch 60 is attached to the bottom plate 40a, it is preferred that part of the cable 64 connecting the switch 60 and the ECU 70 be wired in the supporting base 40, as shown in FIGS. 4 to 6, in consideration of cable routing with the rotation of the rear seat 22 taken into account. The ECU 70 detects the signal from the switch 60, performs and releases the output regulation of the engine, and displays the presence or absence of the output regulation of the engine on a meter 73 according to the performance and release of the output regulation of the engine. In other words, in a state where the ECU 70 receives the ON signal from the switch 60 so as to regulate the output of the engine, the ECU 70 turns on or flashes a first display portion 74 (yellow lamp) of the meter 73. The driver can identify that the output of the engine is regulated. In a state where the ECU 70 receives the OFF signal from the switch 60 so as not to regulate the output of the engine, the ECU 70 turns off the first display portion 74 of the meter 73. The driver can identify that the output of the engine is not regulated. When the switch 60 fails (the switch 60 body may fail or breaking, a voltage short, or a ground short of the cable 64 may occur), that is, when the ECU 70 cannot detect the signal from the switch 60, the ECU 70 turns on a second display portion 75 (red lamp) of the meter 73 of the engine. The driver thus can identify that the switch 60 has failed so that the output of the engine is regulated.

Figure 8:
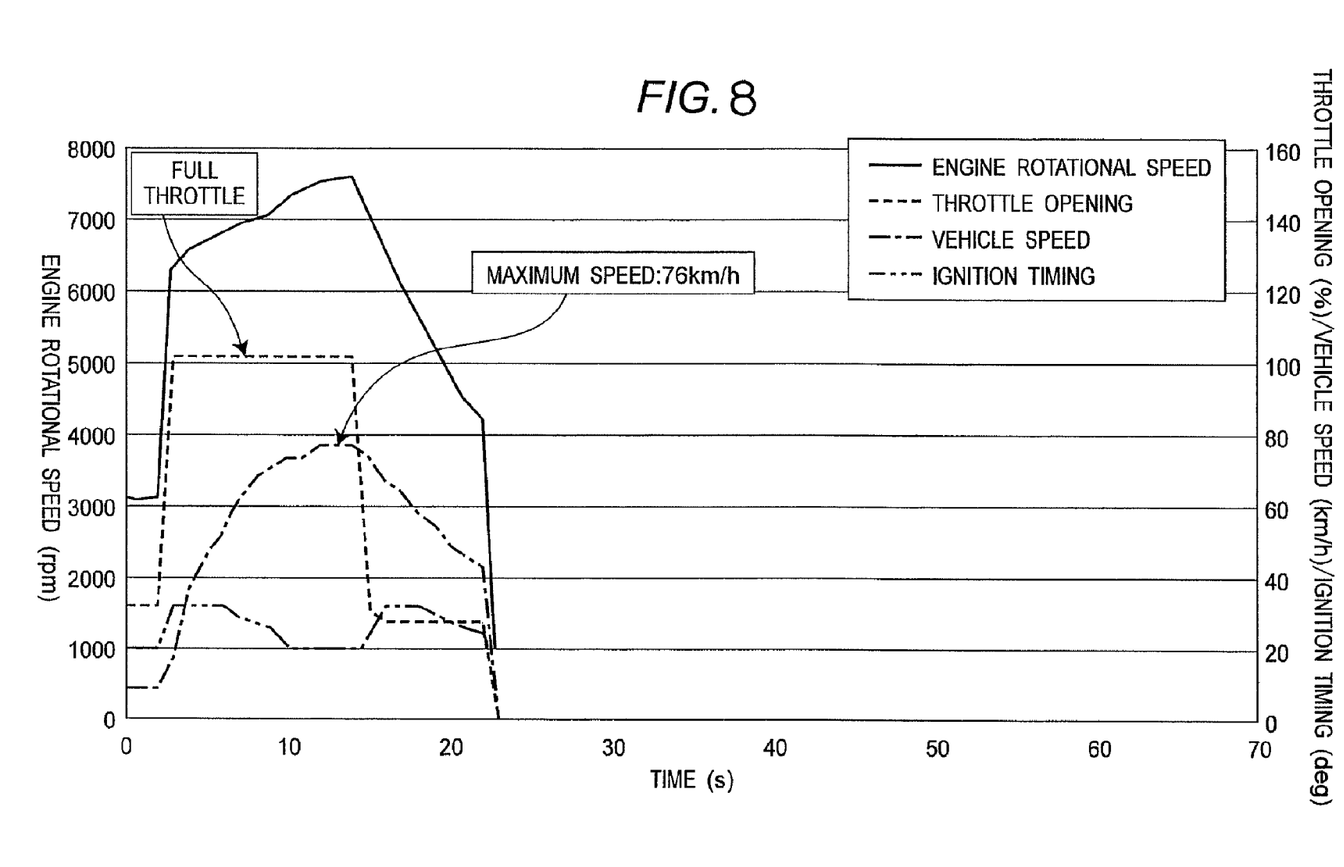
FIG. 8 is a graph showing the change of an engine rotational speed, a throttle opening, a vehicle speed, and an ignition timing with respect to time (horizontal axis) in a state in which the ECU 70 does not regulate the output of an engine.
Figure 9:
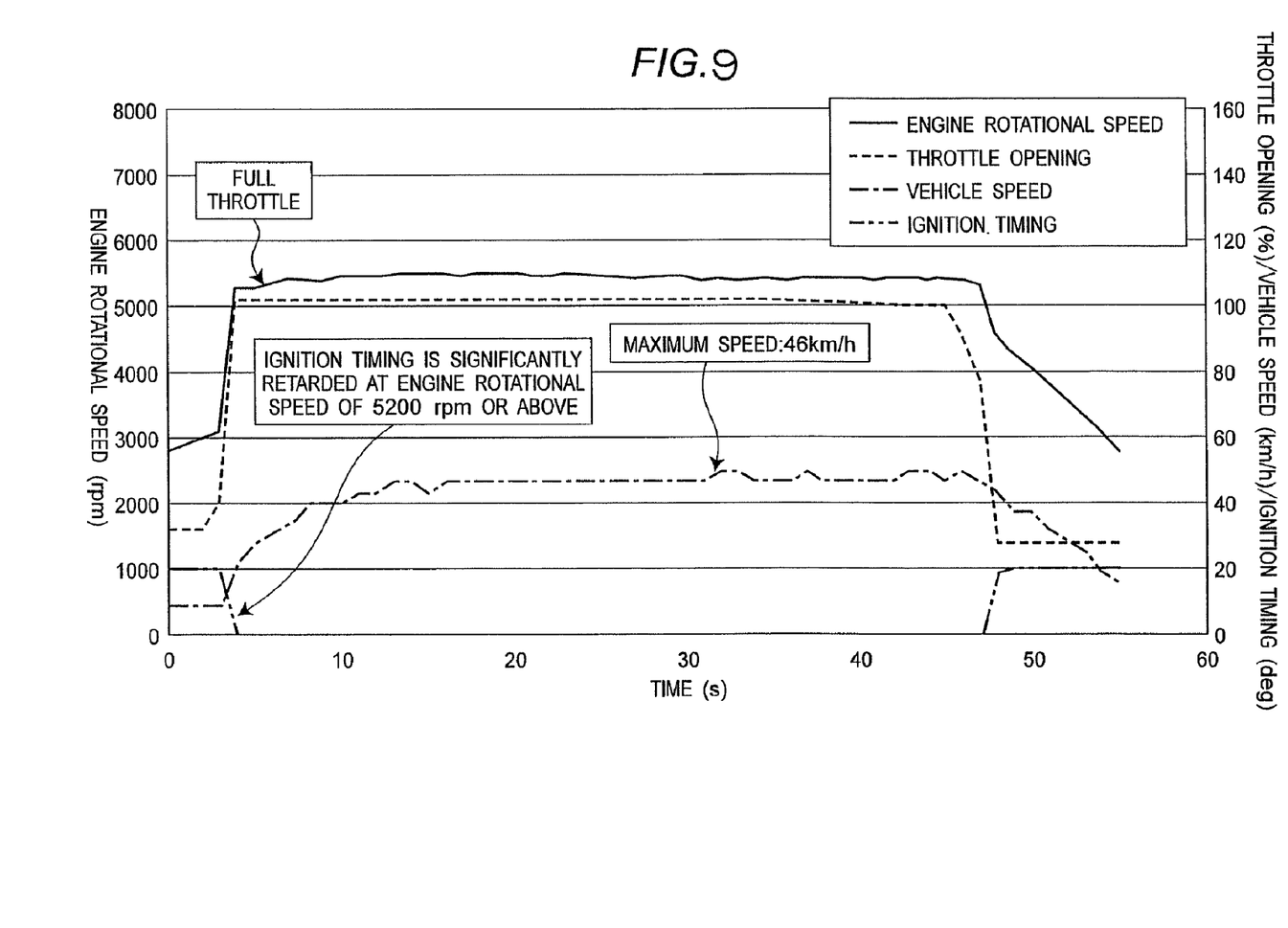
FIG. 9 is a graph showing the change of an engine rotational speed, a throttle opening, a vehicle speed, and an ignition timing with respect to time (horizontal axis) in a state in which the ECU 70 regulates the output of the engine.

FIGS. 8 and 9 are graphs showing states of the all terrain four-wheel vehicle 1 when the ECU 70 does not regulate the output of the engine and regulates the output of the engine. The specific means in which the ECU 70 regulates the output of the engine will be described below with reference to FIGS. 8 and 9.

FIG. 8 is a graph showing the change of an engine rotational speed, a throttle opening, a vehicle speed, and an ignition timing with respect to time (horizontal axis) in a state in which the ECU 70 does not regulate the output of the engine. When the ECU 70 does not regulate the output of the engine, the throttle is fully opened so that the ECU 70 advances the ignition timing from 20° to about 30°. As a result, the engine rotational speed increases from about 3000 to about 6000 rpm. Thereafter, when the ECU 70 changes the ignition timing between 20° and 30° according to the increase of the engine rotational speed, the engine rotational speed increases up to about 7500 rpm and the maximum speed is about 76 km/h.

When the throttle is closed (the throttle opening is 100% to about 30%), the engine rotational speed is lowered to about 4000 rpm and the vehicle speed is about 40 km/h. When the throttle is substantially fully closed, the engine rotational speed is lowered to 1000 to 1500 rpm so as to be the idling rotational speed. After the vehicle speed of the all terrain four-wheel vehicle 1 is 0 km/h, the ignition switch is turned off to stop the engine.

FIG. 9 is a graph showing the change of an engine rotational speed, a throttle opening, a vehicle speed, and an ignition timing with respect to time (horizontal axis) in a state in which the ECU 70 regulates the output of the engine. When the ECU 70 regulates the output of the engine, the throttle is fully opened so that the ECU 70 retards the ignition timing from 20° to 0° or below (about −7° at the minimum). As a result, the engine rotational speed increases from about 3000 to about 5000 rpm. In other words, the amount of increase of the engine rotational speed is reduced as compared with when the ECU 70 does not regulate the output of the engine. At this time, the maximum speed is about 46 km/h.

When the throttle is closed (the throttle opening is 100% to about 30%), the engine rotational speed is lowered to about 4500 rpm and the vehicle speed is 40 km/h or below. In this state, the ECU 70 resets the ignition timing which is retarded to 0° or below (or advances the ignition timing to 20°).

The ECU 70 can regulate the output of the engine by various means. In FIG. 9, the ECU 70 retards the ignition timing of the engine to regulate the output of the engine. However, the means for regulating the output of the engine is not limited to the retardation of the ignition timing. For instance, the ECU 70 can regulate the output of the engine by reducing the fuel injection quantity or the throttle opening. The fuel injection quantity may be reduced by shortening the fuel injection time. As a result, the means for regulating the output of the engine can be performed singly or in combination.

According to the embodiment, the following effects can be exhibited.

(1) When the rear seat 22 is in the installed state, the ECU 70 regulates the output of the engine. The influence of the change of load distribution caused when the passenger is seated on the rear seat 22 can be reduced. The drivability of the pick-up style utility vehicle 1 thus can be improved.

(2) When the rear seat 22 is in the installed state, the output of the engine is regulated. When there is a possibility that the passenger may be seated on the rear seat 22, the output of the engine is regulated. The output of the engine can be regulated more reliably.

(3) The rear seat is shifted between the installed state and the retracted state. In the installed state of the rear seat 22, the switch 60 detects the installed state of the rear seat 22 by the load of the rear seat 22. The installed state of the rear seat 22 can be easily detected.

(4) The detection means for detecting the installed state of the rear seat 22 is the switch 60. The detection means thus can be easily provided. In addition, the switch 60, which is contacted with a different member for detection, detects a load by simply being contacted with the stationary bottom plate 51. Therefore, the installed state of the rear seat 22 can be easily detected.

(5) The ECU 70 retards the ignition timing of the engine to regulate the output of the engine. The output of the engine thus can be easily regulated. For instance, the maximum speed and acceleration of the pick-up style utility vehicle 1 can be regulated. In addition, the ECU 70 can regulate the output of the engine by reducing the fuel injection quantity of the engine.

In the embodiment, the detection means has been described by taking the switch 60 provided on the bottom plate of the rear seat 22 and detecting a load as an example. The detection means of the present invention is not limited to the switch 60.

Figure 10:
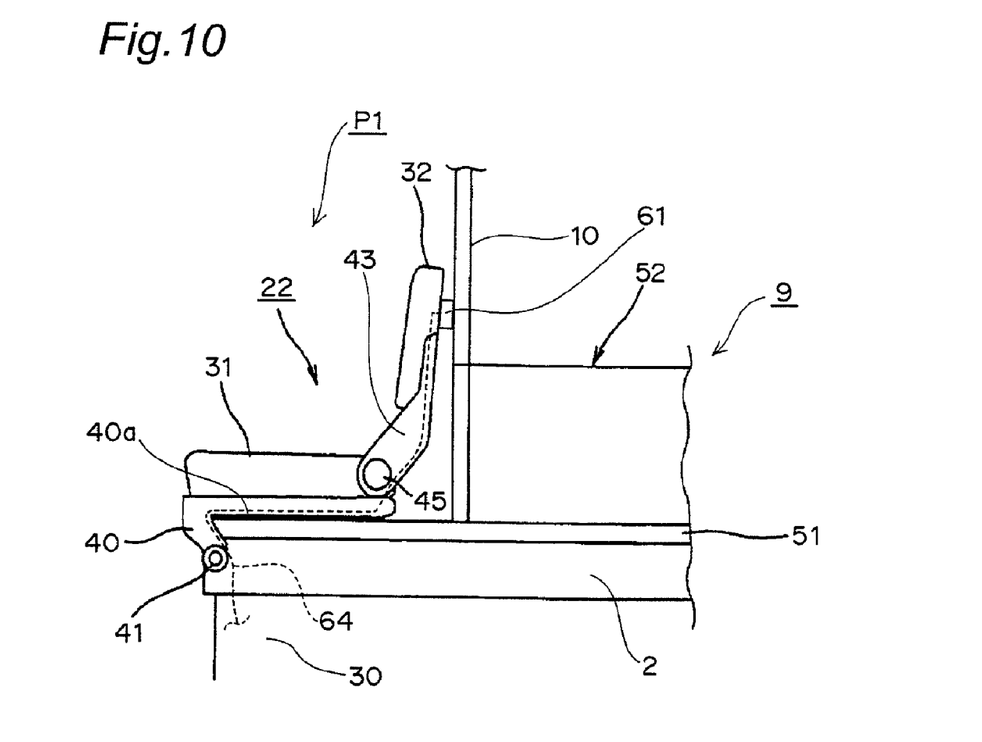
FIG. 10 is a left side view of the rear seat portion showing another embodiment of a switch.

For instance, as shown in FIG. 10, a switch 61 may be attached to a rear surface of the erected backrest 32. In this case, the switch 61 is contacted with the screen shield 10 so as to be in the ON state. In other words, when the backrest 32 is erected so that the passenger can be seated on the rear seat 22, the switch 61 is contacted with the screen shield 10 so that the switch 61 is brought to the ON state. When the backrest 32 is rotated forward about the hinges 45, the switch 61 is not contacted with the screen shield 10 so as to be in the OFF state. In this case, it is preferred that the switch 61 be a switch which is contacted with a different member so as to be in the ON state and is no contacted with the different member so as to be in the OFF state.

When the switch 61 is attached to the rear surface of the backrest 32, it is preferred that part of the cable 64 connecting the switch 61 and the ECU 70 be wired in the rear seat 22, as shown in FIG. 10, in consideration of cable routing with the rotation of the rear seat 22 taken into account.

As another embodiment of the detection means, the detection means may detect the inclination angle of the rear seat 22, and when the detection means detects the substantial horizontal state of the seating portion 31 of the rear seat 22, the detection means detects that the rear seat 22 is in the installed state. In addition, the detection means may be provided on a seatbelt for the rear seat 22, and when the detection means detects the fastening of the seatbelt, the detection means detects that the rear seat 22 is in the installed state.

Further, the detection means does not detect the installed state of the rear seat 22, but may detect the retracted state. In this case, when not detecting a signal from the detection means indicating that the rear seat 22 is in the retracted state, the ECU 70 judges that the rear seat 22 is in the installed state to regulate the output of the engine. As such detection means, for instance, it can be considered that an arm fixing the rear seat 22 in the retracted state, that is, in the erected state is provided on the vehicle body frame and a switch is provided on the arm. This switch detects that the rear seat 22 is fixed into the erected state by the arm.

In this embodiment, the present invention has been described by taking the pick-up style utility vehicle as an example. The present invention is not limited to the pick-up style utility vehicle. The present invention is widely applicable to vehicles having a front seat and a rear seat, e.g., to automatic four-wheel vehicles including the pick-up style utility vehicles.

The present invention is not limited to the configuration of the above embodiment and includes various modified examples contemplated in the scope without departing from the contents described in the claims.

What is claimed is:

1. A vehicle comprising:
    a front seat; and
    a rear seat that is changeable between an installed state in which a passenger can be seated and a retracted state in which the passenger is not seated and the rear seat is retracted;
    an output control unit controlling the output of an engine; and
    detection means for detecting the installed state of the rear seat,
    wherein when the detection means detects the installed state of the rear seat, the output control unit regulates the output of the engine as compared with the output when the detection means does not detect the installed state of the rear seat,
    wherein a seating portion of the rear seat in the installed state is brought to a substantially horizontal state,
    wherein the detection means is a switch operable to detect a load, the switch being provided on a bottom surface of the seating portion when the seating portion of the rear seat is brought to the substantially horizontal state, and
    wherein the seating portion of the rear seat is brought to the substantially horizontal state so that the switch is pressed by the load of the rear seat to detect the installed state of the rear seat.

2. The vehicle according to claim 1, wherein the output control unit changes the ignition timing of the engine to regulate the output of the engine.

3. The vehicle according to claim 1, wherein the output control unit retards the ignition timing of the engine to regulate the output of the engine.

4. The vehicle according to claim 1, wherein the output control unit reduces the fuel injection quantity of the engine to regulate the output of the engine.

5. A vehicle comprising:
    a front seat; and
    a rear seat that is changeable between an installed state in which a passenger can be seated and a retracted state in which the passenger is not seated and the rear seat is retracted;
    an output control unit controlling the output of an engine; and detection means for detecting the installed state of the rear seat, wherein, when the detection means detects the installed state of the rear seat, the output control unit regulates the output of the engine as compared with the output when the detection means does not detect the installed state of the rear seat, wherein a backrest of the rear seat in the installed state is brought to an erected state, wherein the detection means is a switch operable to detect a load and is provided on the backrest of the rear seat, and wherein the backrest of the rear seat is brought to the erected state so that the switch is contacted with a partitioning member partitioning a riding space and a cargo bed to detect the installed state of the rear seat.

6. The vehicle according to claim 5, wherein the output control unit changes the ignition timing of the engine to regulate the output of the engine.

7. The vehicle according to claim 5, wherein the output control unit retards the ignition timing of the engine to regulate the output of the engine.

8. The vehicle according to claim 5, wherein the output control unit reduces the fuel injection quantity of the engine to regulate the output of the engine.

* * * * *